US012313576B2

(12) United States Patent
Cukurel (10) Patent No.: US 12,313,576 B2
(45) Date of Patent: May 27, 2025

(54) MEASUREMENT OF COATING THERMAL PROPERTIES BY INDUCTION RADIOMETRY

(71) Applicant: TECHNION RESEARCH & DEVELOPMENT FOUNDATION LIMITED, Haifa (IL)

(72) Inventor: Beni Cukurel, Kibbutz Nachsholim (IL)

(73) Assignee: Technion Research and Development Foundation Limited, Haifa (IL)

(*) Notice: Subject to any disclaimer, the term of this patent is extended or adjusted under 35 U.S.C. 154(b) by 542 days.

(21) Appl. No.: 17/619,258

(22) PCT Filed: Jun. 24, 2020

(86) PCT No.: PCT/IL2020/050707
§ 371 (c)(1),
(2) Date: Dec. 15, 2021

(87) PCT Pub. No.: WO2020/261272
PCT Pub. Date: Dec. 30, 2020

(65) Prior Publication Data
US 2022/0283105 A1    Sep. 8, 2022

Related U.S. Application Data

(60) Provisional application No. 62/865,365, filed on Jun. 24, 2019.

(51) Int. Cl.
G01N 25/18    (2006.01)
F01D 21/00    (2006.01)
H05B 6/06    (2006.01)

(52) U.S. Cl.
CPC ........... *G01N 25/18* (2013.01); *F01D 21/003* (2013.01); *H05B 6/06* (2013.01); *F05D 2220/32* (2013.01); *F05D 2260/83* (2013.01)

(58) Field of Classification Search
CPC ...... G01N 25/18; G01N 25/00; F01D 21/003; H05B 6/06; H05B 6/101; H05B 2214/03;
(Continued)

(56) References Cited

U.S. PATENT DOCUMENTS 3,781,506 A * 12/1973 Ketchum ............... H05B 6/062
219/626
4,244,985 A * 1/1981 Graff ..................... B05D 7/148
427/195
(Continued)

FOREIGN PATENT DOCUMENTS

CN    102954968 A  *  3/2013
CN    111707529 A  *  9/2020
(Continued)

OTHER PUBLICATIONS

17619258_2024-05-22_CN_102954968_A_H.pdf,Mar. 6, 2013.*
(Continued)

*Primary Examiner* — Gail Kaplan Verbitsky
(74) *Attorney, Agent, or Firm* — Daniel Feigelson (57) ABSTRACT

A system and method for determining the condition of a thermal barrier coating on a base metal component, comprising the use of an induction coil to input into the metallic base layer through the coating layer, a temporally varying heat waveform, and measuring the temperature of the coating surface layer resulting from the input of the heat waveform using a temperature sensor disposed close to the surface of the coating layer. A controller correlates a signal from the temporally varying output of the temperature sensor with a signal corresponding to the temporally varying heat waveform, to determine the phase angle between the signals. The controller uses a mathematical relationship between the phase angle and the frequency of the heat waveform to determine the thermal properties of the non-metallic coating. Both the thermal diffusivity and the barrier (Continued)

coating thickness can be accurately obtained by this method and apparatus.

20 Claims, 7 Drawing Sheets

(58) Field of Classification Search
CPC ... H05B 6/50; H05B 6/62; H05B 3/00; H05B 2213/00; H05B 2214/00; F05D 2220/32; F05D 2260/83
USPC .......................................... 374/45, 102, 103
See application file for complete search history.

(56) References Cited

U.S. PATENT DOCUMENTS

| | | | | |
|---|---|---|---|---|
| 4,647,220 | A * | 3/1987 | Adams | G01N 25/72 374/57 |
| 8,742,347 | B2 * | 6/2014 | Altmann | G01N 1/00 250/332 |
| 8,759,770 | B1 * | 6/2014 | Woods | G01N 25/72 382/152 |
| 2002/0018510 | A1 * | 2/2002 | Murphy | G01N 25/72 374/161 |
| 2005/0257367 | A1 * | 11/2005 | Cirri | B29C 45/2737 29/623.5 |
| 2006/0048581 | A1 | 3/2006 | Bosselman et al. | |
| 2015/0160097 | A1 | 6/2015 | Haldeman et al. | |
| 2015/0355074 | A1 | 12/2015 | Zhou et al. | |
| 2021/0180191 | A1 * | 6/2021 | Fouliard | C23C 28/321 |

FOREIGN PATENT DOCUMENTS

| | | | |
|---|---|---|---|
| CN | 117969597 A * | 5/2024 | |
| EP | 0658068 A2 * | 6/1995 | |
| EP | 2154518 A2 | 2/2010 | |
| WO | 2004065918 A2 | 8/2004 | |

OTHER PUBLICATIONS

17619258_2024-05-22_CN_111707529_A_H.pdf,Sep. 25, 2020.*
17619258_2024-05-22_CN_117969597_A_H.pdf,May 3, 2024.*
17619258_2024-05-22_EP_0658068_A2_H.pdf,Jun. 14, 1995.*
A. Rosencwaig et al., "Theory of the photoacoustic effect with solids," J. Appl. Phys., vol. 47, No. 1, pp. 64-69, 1976.
Yang, Ruizhen, et al. "Optically and Non-Optically excited thermography for compositites: A Review" Infrared Physics and Technology, Elsevier Science, GB vol. 75, pp. 26-50, Jan. 23, 2016.
Extended European Search Report in EP Application No. 20833657.8, dated Nov. 17, 2022, 7 pages.
Ciampa, Francesco, et al. "Recent advances in active infrared thermography for non-destructive testing of aerospace components" Sensors 18(2) (2018): 609, Feb. 16, 2018.
R.E.Taylor, X. Wang, X.Xu, "Thermophsyical properties of thermal barrier coatings", Surf. Coat. Technol., vol. 121 pp. 89-95, 1999.
D.G.Cahill, "Thermal conductivity measurement from 30 to 750K: The 3w method", Rev. Sci. Instrum., vol. 61, No. 2, pp. 802-808, 1990.
C.A.Bennett, R.R.Patty, "Thermal wave interferometry: a potential application of the photoacoustic effect.," Appl. Opt., vol. 21, No. 1, pp. 49-54, 1982.
A Bendada, "Sensitivity of thermal-wave interferometry to thermal properties of coatings: Application to thermal barrier coatings," Meas. Sci. Technol., vol. 13, No. 12, pp. 1946-1951, 2002.
T. Kakuda, A. Limarga, A. Vaidya, A. Kalkami, T.D.Bennett, "Non-destructive thermal property measurements of an APS TBC on an intact turbine blade," Surf. Coatings Technol., vol. 205, No. 2, pp. 446-451, 2010.
I.S.A. Transactions, C.S. Subramanian, T. Amer, B. T. Upchurch, D.W. Alderfer, C. Burkett, "New device and method for measuring thermal conductivity of thin-films," vol. 45 No. 3, pp. 313-318, 2006.
R. Taylor, "Thermal conductivity determinations of thermal barrier coatings", Mater. Sci. Eng. A, vol. 245, No. 2, pp. 160-167, 1998.

* cited by examiner

| Technique | Summary | Accuracy | In-Situ Capability |
|---|---|---|---|
| 1. Laser Flash | Vacuum or inert environment, laser energy source and detector set are used to read time of temperature rise to derive diffusivity | high range, high sensitivity to thickness + time, usable up to 500°C | Very low - needs vacuum or inert environment |
| 2. 3-Omega | Electrical heating element is used to measure temperature's dependency on source frequency, thus deriving conductivity coefficient | Good | Low – requires wire strap |
| 3. Photo-Acoustic | Heat waves created by a laser beam, create acoustic waves detected by a microphone and the phase lag between the waves is used to derive diffusivity | 10% | None – requires closed cell |
| 4. PopTea (Photo-thermal emission) | Phase of photothermal emission, created by laser heating, is measured in order to derive diffusivity | 20% requires thickness | Good - measure + heat on exposed coating side |
| 5. Thermal wave interfero-metry (TWI) | Phase of thermal waves from TBC-substrate interface interference is measured and compared to samples | 15-70% | Low – requires preparation of samples |
| 6. TFTCM | Complex setup with isolated specimen in inert environment with heat flux source at its bottom is used to determine conductivity coefficient | 5% | None – requires vacuum system |

Fig. 6

MEASUREMENT OF COATING THERMAL PROPERTIES BY INDUCTION RADIOMETRY

FIELD

The present disclosure describes technology related to the field of the measurement of the thermal properties of thermal barrier coatings on metallic base materials, especially by using phase measurements on the heat transfer from the metallic base material heated by induction heating.

BACKGROUND

The blades of a gas turbine engine are exposed to the high temperature gases emitted from the combustion of the compressed fuel-air mixture, and therefore attain a very high temperature. In order to limit the temperature rise of the blade material itself, and thus to maintain its mechanical properties as well as possible, the blades are generally coated with a thermal barrier coating, having a low thermal diffusivity, thus providing some extent of insulation of the blade material from the hot turbine gases. The hot section parts are usually made from super alloys, such as Inconel, and the Thermal Barrier Coatings (TBC) are generally non-ferrous ceramic materials such as such as Yttria-Stabilized Zirconia (YSZ). The purpose of TBC is to protect the part from prolonged exposure to high temperatures, which could result in thermal fatigue and oxidation. Thus, the thermal properties of TBC play a crucial role in determining the level of engine durability. Current techniques that are used to measure the thermal properties of TBC are complex, but more importantly, are unable to readily perform in-situ inspections. Inspection of the innermost blades of a gas turbine engine without disassembly, requires access by means of bore-scope instruments, and it is difficult to provide such access using some of the presently used methods for determining the thermal properties and thickness of turbine blade coatings.

A number of methods are used in order to determine the thermal properties of a thin insulating coating on a more highly conductive base metal material. These solutions are based on delivering energy to the external surface of the inspected part, such as by laser pinging or by application of an electrical heating source, while measuring the component response in the form of a temperature rise or radiation emission. All of these methods have the limitation that they require the measurement to be conducted on a dedicated sample. Thus, these techniques can't be applied in situ to evaluate properties of real hardware as it ages.

The following are brief summaries of some presently used methods:

1. Laser Flash Technique—The most commonly used method is the laser flash technique, which is the ASTM standard method (E1461). Many of the heat conduction based properties measured since 1980 have been obtained by this well-developed technique that is useful over a large range of diffusivity values and measurement temperatures, as for instance, described in the article by R. E. Taylor, et al, entitled "Thermophysical properties of thermal barrier coatings," and published in Surf. Coat. Technol., vol. 121, pp. 89-95, 1999. The technique involves subjecting the entire front surface of a small specimen to a burst of energy from a laser, with irradiation times of less than 1 msec. The resulting temperature rise is recorded at the rear surface, and is analyzed by comparing it to mathematical solution for a semi-infinite specimen at a constant temperature being exposed to a flash of energy. While both the bulk density and the specific heat of the coating are considered constant and relatively insensitive to the microstructure and small variations in composition, the value of thermal conductivity can be derived from the thermal diffusivity.

While this method is feasible for the millimeter range of coatings, it is rather difficult to apply it to very thin free-standing coatings (10-50 μm). In this case, it is necessary to add thin coatings to the front surface to prevent laser beam penetration. The presence of this additional protective layer must be accounted for. The obtained diffusivity values are highly sensitive to the uncertainty in the measured coating thickness and half-times. The sensitivity increases significantly with rising thickness, confining meaningful results to only thin layers, according to the previously mentioned article by Taylor, et al. In addition to that, the overall accuracy of the method is poor, ranging to up to many tens of percent inaccuracy under some conditions.

2. The 3-omega method, as described in the above-referenced paper by Taylor et al., and in the paper by D. G. Cahill, entitled "Thermal conductivity measurement from 30 to 750° K: The 3ω method," Rev. Sci. Instrum., vol. 61, no. 2, pp. 802-808, 1990.

3. Photo-Acoustic Technique, as described in C. A Bennett et al., in "Thermal wave interferometry: a potential application of the photoacoustic effect.," Appl. Opt., vol. 21, no. 1, pp. 49-54, 1982, and in A. Rosencwaig et al., in "Theory of the photoacoustic effect with solids," J. Appl. Phys., vol. 47, no. 1, pp. 64-69, 1976.

4. Phase of Photo-Thermal Emission Analysis (PopTea) Technique, as described by T. Kakuda, et al., in "Non-destructive thermal property measurements of an APS TBC on an intact turbine blade," Surf. Coatings Technol., vol. 205, no. 2, pp. 446-451, 2010.

5. Thermal wave Interferometry (TWI) Technique, as described in A. Bendada, "Sensitivity of thermal-wave interferometry to thermal properties of coatings: Application to thermal barrier coatings," Meas. Sci. Technol., vol. 13, no. 12, pp. 1946-1951, 2002.

6. Thin Film Thermal Conduction Meter (TFTCM) Technique, as described by C. S. Subramanian, et al., in "New device and method for measuring thermal conductivity of thin-films," I. S. A. Transactions, vol. 45, no. 3, pp. 313-318, 2006.

Figure 1:
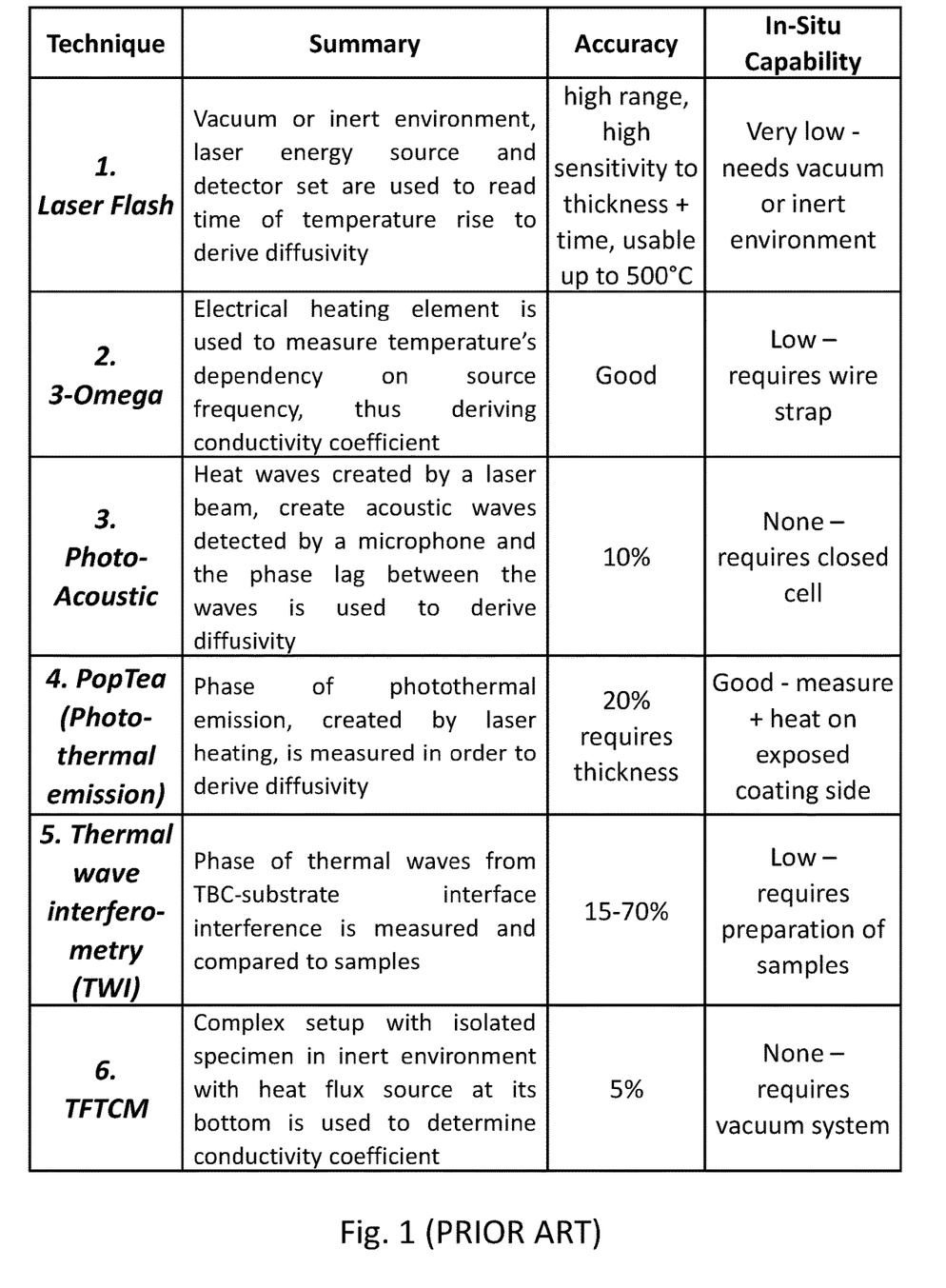
FIG. 1 summarizes previous methods, and provides approximate reported estimates of their accuracy, and their likely ability to perform the measurements in situ.

FIG. 1 briefly summarizes these methods, and provides approximate reported estimates of their accuracy, and their likely ability to perform the measurements in situ. The complexity of the existing measuring techniques prevents them from being used in-situ. An important need for the measurement of coating properties is for use on installed jet engine rotor and stator blades and airfoils, i.e. on-wing inspections, or inspections without the need for disassembly of the engine. The motivation is to prevent unscheduled component replacement due to unexpected and un-quantifiable damage and to prolong the service time between scheduled component overhaul. The methods should be able to measure the TBC thermal properties directly in fully assembled jet engines with sufficient accuracy to enable decisions to be made about the ability of the engine to continue use without the need to overhaul the turbine blades.

The above described methods are generally unable to address the need for either accurate quantitative measurements or in-situ measurements, as they require complex setups that typically include vacuum chambers, inert environments, special electrical connections, the manufacture of representative test samples and other features that are unavailable in the field.

In addition, existing techniques have insufficient accuracy due to the nature of the physics involved in the measurements. In all of the above described methods, the thermal input perturbation is applied on the outer side of the coating and has to travel through the coating to create a response in the substrate base metal, and these temperature changes in the substrate are propagated back through the coating to the outer surface where they can be measured. This creates a complex double inverse heat transfer problem that is difficult to solve and is inherently prone to errors.

The disclosures of each of the publications mentioned in this section and in other sections of the specification, are hereby incorporated by reference, each in its entirety.

SUMMARY

The present disclosure attempts to provide novel systems and methods that overcome at least some of the disadvantages of prior art systems and methods.

The present system utilizes a novel technique to perform simple measurement of the thermal properties of a thermal barrier coating by generating internal heat inside the base metal by means of eddy currents generated in the base metal by electromagnetic induction heating from outside the thermal barrier coating. The use of induction heating generates heat directly within the base metal, without involving either heat generation in the TBC, or any input heat transfer through the TBC, the latter generally being an electrical insulator. Because of the skin effect in a high frequency induced current, the heat is generated in the base metal close to the interface between the thermal barrier coating and the base metal, and diffuses back through the thermal barrier coating and towards the external environment, where the time dependent change in temperature, or its radiometric signature at the outer surface of the thermal barrier coating is continuously recorded, typically by using a pyrometer sensor head, or any other temperature sensing device. The thermal properties of the TBC are calculated using an analytic heat conduction model. The solution to the heat transfer model can be performed by adaption of a physical model for heat flow solution, and the resulting mathematical equations should be developed to determine the TBC thermal properties by solving the relationship between the input induction parameters, especially the phase and exciting frequency, and the outer surface time dependent temperature responses for a selected range of excitation conditions.

The time evolution of the temperature is read by the pyrometer which is also placed close to the outer surface of the coating layer. The reading is then processed, and the phase response is calculated and compared to a physical model which derives the thermal properties of the coating namely the thermal diffusivity as well as the thickness of the coating layer. No calibration is needed as the thermal response amplitude is not involved, only the time lag between the current induction and the temperature detector measurement being relevant to the measurement of the thermal properties.

A simple phenomenological way to describe the solution to the heat transfer problem is by observing the time delay generated between the point of time of the heat input by the induction heater and the time at which that heat becomes detectable at the outer surface of the TBC. This can be most easily achieved by inputting to the induction heater coils, a high frequency induction heating current, which is amplitude modulated at a substantially lower frequency, thus creating an amplitude modulated heating effect, and measuring the phase shift generated between that modulated input current, and the detection of the heat diffusing out through the TBC at the external surface of the TBC. It is to be emphasized that this amplitude modulation takes place at a frequency which is suitable for tracking the heat propagation within the sample being measured, and is orders of magnitude below the high frequency AC used to generate the heating effect, which is typically of the order of at least 100 kHz and even up to several hundred kHz or more. A modulation frequency of the order of 10 Hz or tens of Hz is typically suitable. Because of the number of unknowns involved in the solution of the heat diffusion equations, these phase shift measurements can be performed at a number of different AM frequencies, in order to enable solutions of the heat transfer equations to be obtained. This can be achieved according to one implementation, by sweeping the AM frequency with time over a predetermined range.

The system operates using an input heating current provided by an induction heating coil or coils, fed by an RF source which can modulate the output as required for the measurement protocol. Detection of the temperature change at the outer surface of the thermal barrier coating can be performed by using a pyrometric sensor head, or any other temperature sensing device. The sensor head can be disposed on the end of a rod which can be inserted through a bore-hole in an engine casing to access inner blades of the engine. The size of such a probe is generally limited by the need to insert the induction heating coils. Since the only function of the heating coils is to create a temperature perturbation in the metal base material, the supplied power can be in the order of 10-100 W. This can be achieved by a small pancake-shaped induction coil of few cm diameter, or a cylindrical coil of smaller diameter, while all oscillatory circuits providing the current fluctuations are contained in the power supply outside of the engine.

The mathematical formalism of how the method is implemented is based upon a solution of the heat transfer equations from just inside of the interface of the metallic substrate with the TBC, through the TBC and out of the outer surface of the TBC, which is the only location in the entire heat flow where direct access is available to measure temperature response, which is the tangible measure of the effect of the heat flow. Therefore, the problem evolves into determining the thermal characteristics of the TBC, when the only available data are:

(i) the temporal arrangement of the heat generation at the starting point of the heat flow, which, being deep within the sample being tested, is inaccessible for a direct temperature measurement, and (ii) a temporal signal measurement that is proportional to the temperature on the surface of the TBC, which is the location of the end of the heat flow.

The mathematical solution of the heat flow equations eventually shows that the level of the temperatures at the various points along the flow is of minor importance in determining the parameters sought, which are dependent essentially only on temporal measurements of the phase shifts between the input heat function, and the output temperature response measurements.

The heat transfer problem can be schematically described by a spatial model comprising a two layered slab, the first layer being defined between positions in the flow path given by $x=0$ and $x=a$, where a is the position of the interface, and the second layer being defined between $x=a$ and $x=b$, where b is the position of the outer surface of the TBC. The layers in the model are assumed to have perfect thermal contact, meaning that there is no temperature drop across the interface at the contact point (x=a). The heat flux is thus equal and continuous at the contact point.

Before commencement of the heat input, at t=0, the two layers have temperature distributions of F1(x) and F2(x) respectively. At the moment of commencement of the heat input, at a time t>0, the energy source is internally activated in layer 1 and creates internal heat generation at a rate defined as g(x, t). At x=0, which is the surface of the composite slab remote from layer 2, slab surface temperature is kept constant at T1=0 by convection contact with the environmental heat sink, while at x=b, the heat is dissipated into an environment which has a zero temperature difference with respect to a reference level. The mathematical formulation of this problem can be generated based on the general principles of heat transfer as presented in Chapter 10-6 of the book by W. D. Hahn and N. M. Ozisik, entitled "Heat Conduction" Wiley, Hoboken, N.J., from page 744, (2012).

Once the rigorous mathematical derivations of the heat transfer function have been performed, using Green function solutions and expressed in hyperbolic identities, a closed form expression for the transfer function through the second slab, which represents the TBC, can be obtained, by assuming perfect heat transfer within the first slab, which has a substantially higher thermal diffusivity than the second slab.

From this transfer function, a closed expression for the expected phase lag φ of the heat flow between input by the induction heating to detection by the pyrometer, can be calculated as:

$$\phi = \arctan(\mu(\kappa, \beta, L)) \quad (1)$$

where the expression μ is given by:

$$\mu(\kappa, \beta, L) = \frac{-\kappa \cdot \beta \sin\left(\frac{L}{2\beta}\right)\cosh\left(\frac{L}{2\beta}\right) - \left(\kappa \cdot \beta \cos\left(\frac{L}{2\beta}\right) - \sin\left(\frac{L}{2\beta}\right)\right)\sinh\left(\frac{L}{2\beta}\right)}{\left(-\kappa \cdot \beta \sin\left(\frac{L}{2\beta}\right) - \cos\left(\frac{L}{2\beta}\right)\right)\cosh\left(\frac{L}{2\beta}\right) + \kappa \cdot \beta \cos\left(\frac{L}{2\beta}\right)\sinh\left(\frac{L}{2\beta}\right)} \quad (2)$$

where $$\kappa = \frac{h}{k} \text{ and}$$

$$\beta = \sqrt{\frac{\alpha}{2\omega}}$$

and where

ω is the angular frequency of the modulated input heating source,

α is the thermal diffusivity of the second slab, h is the heat transfer coefficient, and k is the thermal conductivity (heat conduction coefficient) of the second slab.

Since an analytically defined transfer function has been obtained, the expression μ can be used to exactly determine the slab thermal properties from the measured phase angle.

The derivative of the expression μ with respect to any of its parameters, enables the sensitivity of the phase lag φ as a function of that parameter to be simply determined, thus:

$$\frac{\partial \phi}{\partial \xi_i} = \frac{1}{1 + \mu(\kappa, \beta, L)^2} \cdot \frac{\partial \mu}{\partial \xi_i} \quad (3)$$

$$\frac{\partial \mu}{\partial \xi_i} = \frac{\partial \mu}{\partial \kappa} \cdot \frac{\partial \kappa}{\partial \xi_i} + \frac{\partial \mu}{\partial \beta} \cdot \frac{\partial \beta}{\partial \xi_i} + \frac{\partial \mu}{\partial L} \cdot \frac{\partial L}{\partial \xi_i} \quad (4)$$

where $\xi_i$ can be any one of L, ω, α or k.

When these derivatives are calculated, using typical values of the various parameters, it becomes apparent that the phase lag φ is significantly more strongly dependent on some of the parameters than on others. Thus, for instance, it is noted that the phase lag has a substantially stronger dependence on the terms in equation (2) which are dependent on β, which always appears with L in the angular operand of the angular and hyperbolic functions, than on κ. Besides the mathematical result, this result has a physical interpretation, since the parameter on $\beta = (\alpha/2\omega)^{1/2}$, and the dynamic solution of the heat transfer problem, depending on the dissipation of the heat down the transfer path, is clearly strongly related to a, the heat dissipation coefficient. On the other hand, κ=h/k, depends on two parameters which are relate primarily to the boundary conditions of the heat transfer problem, and do not thus strongly influence the dynamic solution and hence the phase angle.

When the derivatives of the phase lag angle are determined with respect to the various parameters, it is found that the dependence on a is always dominant, as explained above, while the dependence on k and h is small.

Returning now to the practical implementation of these results, the method and system are intended to determine the state of thermal repair of the thermal barrier coating, which is layer 2 of the mathematical derivations whose results are given above in equations (1)-(4). The parameter which mostly importantly describes the state of the coating is the thermal diffusivity α. In order to provide sufficient thermal insulation, a should be as low as possible, and any rise in its measured value above the permitted level, would indicate that the blade needs recoating.

Referring now back to the expression for the measured phase lag measured φ, the complete coated blade system responds according to this expression. κ is dependent on the heat transfer coefficient and the thermal conductivity, while β is dependent on the thermal diffusivity and the heat excitation frequency. Therefore, by performing measurements at a number of modulation frequencies, unknown parameters can be determined, and, if sufficient different frequencies are used, even redundantly and hence more accurately determined.

It is noted that, as illustrated above, one of the terms in the expression for the phase lag φ, is weak, namely that dependent on κ, while the other term, namely that dependent on β, is dominant. The κ term is weak because phenomenologically, it comprises the heat transfer coefficient, h, being related mainly to the boundary conditions, which may not be well defined because of their dependence on the convection heat losses at the outer boundaries of the flow path, these being far less important than the flow characteristics within the materials.

The dominant β term on the other hand, is the only term which involves the thermal diffusivity α, such that accurate determination of this term enables accurate determination of both the main parameter α relating to the quality of the coating, and L, the coating thickness, which is the second term which determines the state of the coating, i.e. how eroded its thickness has become in use. β also involves ω, and it is this feature which enables the thermal parameters to be readily extracted by measuring the phase change using different values of ω, making the method readily workable.

Thus, the method enables accurate determination through the phase and the frequency parameters, which would be used to assess the state of the thermal barrier coating.

There is thus provided in accordance with an exemplary implementation of the devices described in this disclosure, a system for determining the thermal properties of a non-metallic coating on a metallic base layer, comprising:

(i) an induction heating coil positioned to input through the coating and into the metallic base layer, a temporally varying heat waveform;

(ii) a sensor for determining temporal changes in temperature, disposed in proximity to or in contact with the outer surface of the coating, such that it can determine temporal changes in temperature of the outer surface of the coating, resulting from the input of the temporally varying heat waveform; and (iii) a controller configured to receive a signal from the temporally varying output of the sensor and a signal corresponding to the temporal variation of the heat waveform, and to correlate the signals to determine the phase angle between the temporally varying output of the sensor and the temporally varying heat waveform; wherein the controller is further adapted to use a relationship between at least one phase angle and the corresponding frequency of the temporally varying heat waveform to determine the thermal properties of the non-metallic coating.

In such a system, the relationship may further include the thickness of the non-metallic coating. In that case, the thickness may be either known, or determined by the controller from the relationship used.

In any of the above described systems, the signal corresponding to the temporally varying heat waveform may be obtained from a power supply providing the current for the induction heating coil.

Additionally, the temporal variation of the heat waveform may have an amplitude modulated form. That amplitude modulation may be performed sequentially over a swept frequency range.

There is further provided in accordance with other implementations of the systems of the present disclosure, any of the systems described above, in which the functional relationship between the phase angle and the frequency of the temporally varying heat waveform in any of the above described systems may be obtained from a solution of the heat transfer equations describing the thermal dynamics of the heat flow from the metallic base layer to the outer surface of the coating. Additionally, the thermal properties which the controller is adapted to determine may include at least one of the thermal diffusivity, the heat transfer coefficient, and the thermal conductivity.

Furthermore, any of the above described systems may be adapted to further determine the thickness of the non-metallic coating. Additionally, the metallic base layer may be an element of a turbine, and the non-metallic coating may then be a ceramic thermal barrier coating applied to the turbine element.

There is also provided, any of the above described systems in which the sensor and the induction heating coil are disposed within a rod, the rod having a sufficiently small diameter that it can be used for in-situ examination of the blades of a gas turbine. Any of the previously mentioned sensors may be either a radiation pyrometer or a contact temperature probe.

There is even further provided in accordance with the various embodiments of the present disclosure, a method of determining the thermal properties of a non-metallic coating on a metallic base layer, the method comprising:

(i) using an induction coil to input into the metallic base layer through the coating layer, a temporally varying heat waveform;

(ii) determining temporal changes in temperature of the coating surface resulting from the input of the temporally varying heat waveform, by using a thermal sensor disposed in proximity to or in contact with the outer surface of the coating;

(iii) correlating a signal corresponding to the temporally varying output of the thermal sensor with a signal corresponding to the temporally varying heat waveform, and determining the phase angle between the signals; and (iv) using a relationship between a phase angle and the corresponding frequency of a temporally varying heat waveform, to determine the thermal properties of the non-metallic coating.

In such a method, the relationship may further include the thickness of the non-metallic coating. In that case, the thickness may be either known, or determined by the controller from the relationship used.

In any of the above described methods, the signal corresponding to the temporally varying heat waveform may be obtained from a power supply providing the current for the induction heating coil.

Additionally, the temporal variation of the heat waveform may have an amplitude modulated form. That amplitude modulation may be performed sequentially over a swept frequency range.

There is further provided in accordance with other implementations of the methods of the present disclosure, any of the methods described above, in which the functional relationship between the phase angle and the frequency of the temporally varying heat waveform in any of the above described systems may be obtained from a solution of the heat transfer equations describing the thermal dynamics of the heat flow from the metallic base layer to the outer surface of the coating. Additionally, the thermal properties which the controller is adapted to determine may include at least one of the thermal diffusivity, the heat transfer coefficient, and the thermal conductivity.

Furthermore, any of the above described methods may be adapted to further determine the thickness of the non-metallic coating. Additionally, the metallic base layer may be an element of a turbine, and the non-metallic coating may then be a ceramic thermal barrier coating applied to the turbine element.

There is also provided, any of the above described methods in which the sensor and the induction heating coil are disposed within a rod, the rod having a sufficiently small diameter that it can be used for in-situ examination of the blades of a gas turbine. Any of the previously mentioned sensors may be either a radiation pyrometer or a contact temperature probe.

BRIEF DESCRIPTION OF THE DRAWINGS

The present invention will be understood and appreciated more fully from the following detailed description, taken in conjunction with the drawings in which.

DETAILED DESCRIPTION

Figure 2:
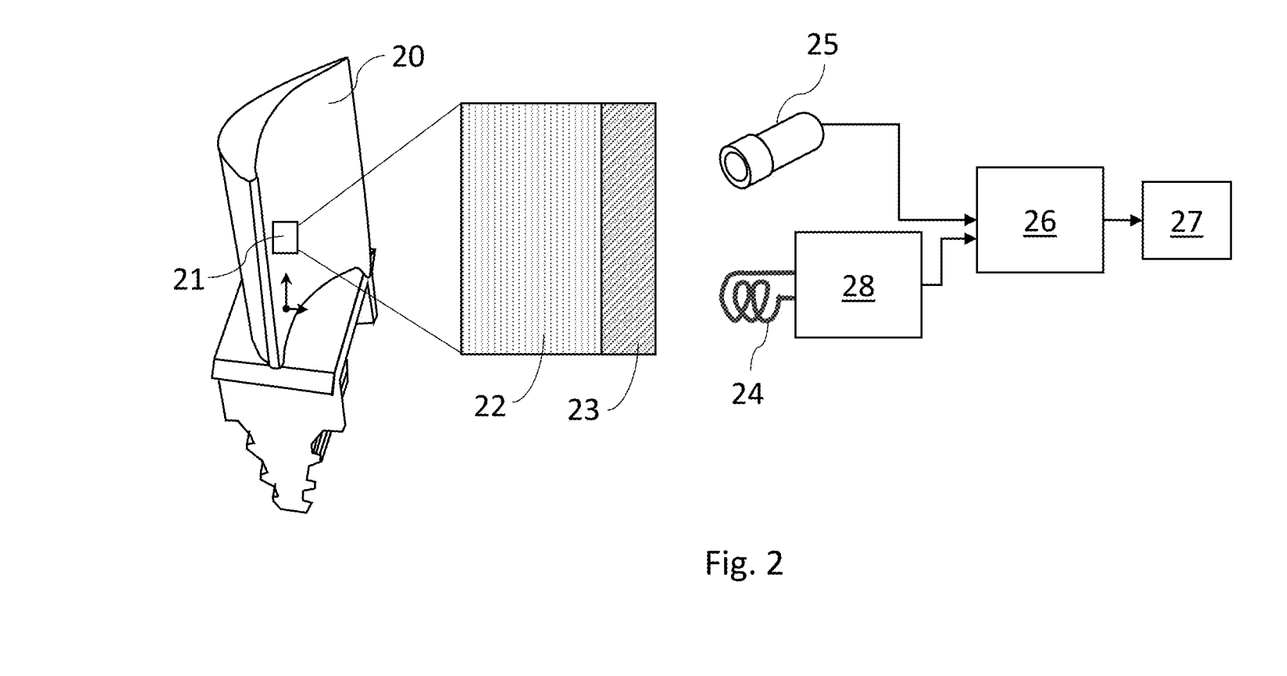
FIG. 2 illustrates schematically a system able to implement the methods for measurement of coating thermal properties by induction radiometry described in the present disclosure.

Reference is now made to FIG. 2, which illustrates schematically a system which is able to implement the methods described in the present disclosure. The measurement is being performed on a turbine blade 20, which could be a blade situated within a gas turbine engine while the engine is mounted on the wing of an aircraft, for instance. A small rectangular section 21 of the turbine is shown in blown up form such that its cross-section can be viewed. The base metal 22 of the turbine blade, which is typically a nickel super-alloy, has a thermal barrier coating (TBC) 23, generally a high temperature ceramic coating, on its outer surface, to protect the metallic blade substrate from the extremely hot combustion gases driving the turbine. The TBC may either be directly coated onto the turbine blade such as by a plasma coating process, or it may be coated by means of a thin bonding layer. For the sake of simplicity, the thickness of the bonding layer is not shown in FIG. 2, though it must be taken into account in the solution of the heat transfer equations, if it has a significant effect on the heat flow.

The heat input into the turbine substrate material is achieved by means of an induction coil 24, powered by a high-frequency current generator 28. If necessary for higher power testing, connection can be by means of copper tubes through which cooling water for the induction heating coil is circulated. The form of the coil 24 can be selected in order to match the particular environment of the parts to be measured. Because of the skin effect taking place within the blade substrate, most of the induced heat is generated close to the boundary between the substrate 22 and the TBC 23. The heat flows from the region in which it is generated close to the boundary layer between the substrate and the TBC, both into the metallic material of the blade substrate 22, and also outwards through the TBC 23 and back towards the outer surface of the TBC, as will be shown below in FIG. 4. The change in the thermal radiation signature associated with the temperature evolution of the outer surface of the TBC can be measured by means of a pyrometer 25, which uses the emitted thermal radiation from the outer surface to determine the surface temperature. The exact method of determining the temperature is dependent on the sensor used. A pyrometer measures thermal radiation, which assumes a value of the emissivity of the surface of the TBC to define the surface temperature. However, a contact thermocouple or other device which directly measures temperature, such as a thermistor, could equally well be used. Such a contact temperature measurement device would have to have connecting wires of such thin dimensions that it would not affect the temperature recorded because of heat flow through it. If a radiation detector such as a pyrometer is used, its wavelength sensitivity should cover the approximate region of radiation expected from the surface of the TBC. For the comparatively low level of powers needed for using the system of FIG. 1 to test turbine blades, (a few tens of Watts), the surface temperature is not expected to rise above ambient temperature by more than a few degrees, such that a detector sensitive to the mid-1R range is needed, covering any region of between 5 to 15 μm, though this range is not critical so long as the pyrometer can measure the surface temperature expected from the power levels used by the induction heater. As will be shown below, since the system is insensitive to the output levels, only to the time varying element being relevant, the accuracy of the temperature measurement is unimportant.

Although the induction coil 24 and the pyrometer sensor head 25 are drawn for clarity in different positions, it is to be understood that they should be directed at the same region of the sample to provide accurate data. An especially convenient arrangement for the implementation of the system of FIG. 2 would be to mount the pyrometer or other temperature measurement device, on the end of a rod, which can also incorporate the induction heating coil, such that the entire exciting/sensing element can be inserted into a bore-sight hole in a turbine engine for inspection of internal parts, which would otherwise not be accessible without disassembly. The rod need have a diameter of no more than 1 cm. or perhaps 1.5 cm., such that such a blade inspection system would provide inspection abilities for thermal barrier coating condition, which were not available hitherto.

The output signal from the pyrometer is input into a control system 26, into which is also input information from the current generator 28, regarding the modulation pattern applied to the output power of the induction heater, in terms of the temporal form of the output modulated power. The control system 26 should include a processor capable of using the solutions to the heat transfer equations to calculate from the input timing information, the thermal coefficients of the TBC which reflect the temporal input information. The calculated thermal coefficients of the TBC, including combinations such as of the thermal diffusivity, the heat transfer coefficient, the thermal conductivity and the effective thickness of the barrier coating, are then provided to the user through the output port 27. In a typical application of turbine TBC coating thermal property measurements, the only elements that would need to be introduced in the proximity of the airfoil would be the induction coil 24 and the pyrometer head 25. All other components can be located outside of the engine.

Figure 3A:
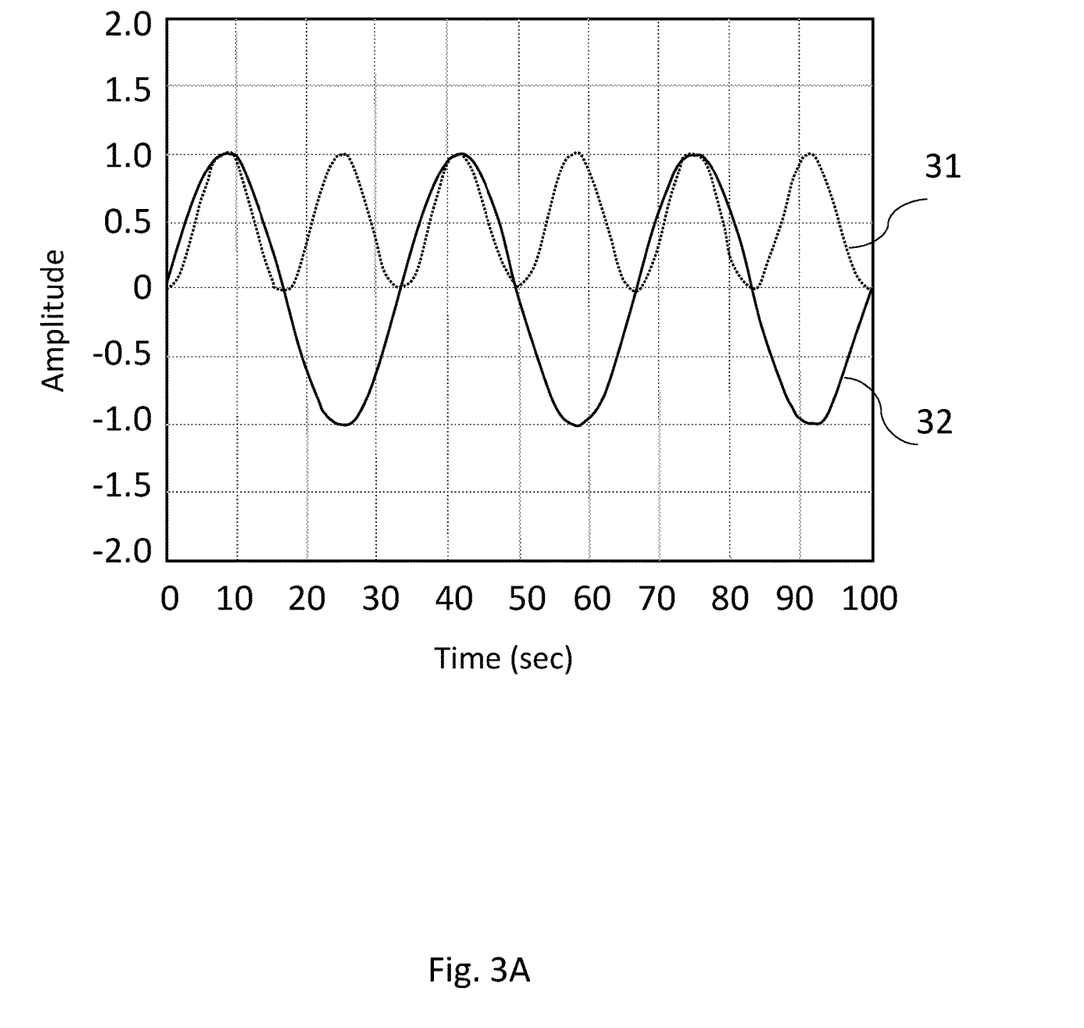
FIGS. 3A to 3C illustrate schematically amplitude modulation schemes for the excitation current through the induction coil and the resultant heat generation response within the metallic body.

Reference is now made to FIG. 3A, which illustrates the effect of a sinusoidal varying input induction power represented by the input current signal 32 having a frequency of 0.03 Hz. on the heat generated in the metallic substrate being heated, represented by the internal heat generating signal 31, having a dominant frequency of 0.06 Hz, which shows an in-phase heating effect, but at twice the frequency of the input power signal 32. The reason for this is that the input induced power heats the substrate whether the input power is on the positive or the negative leg of the sinusoidal input power curve.

Figure 3B:
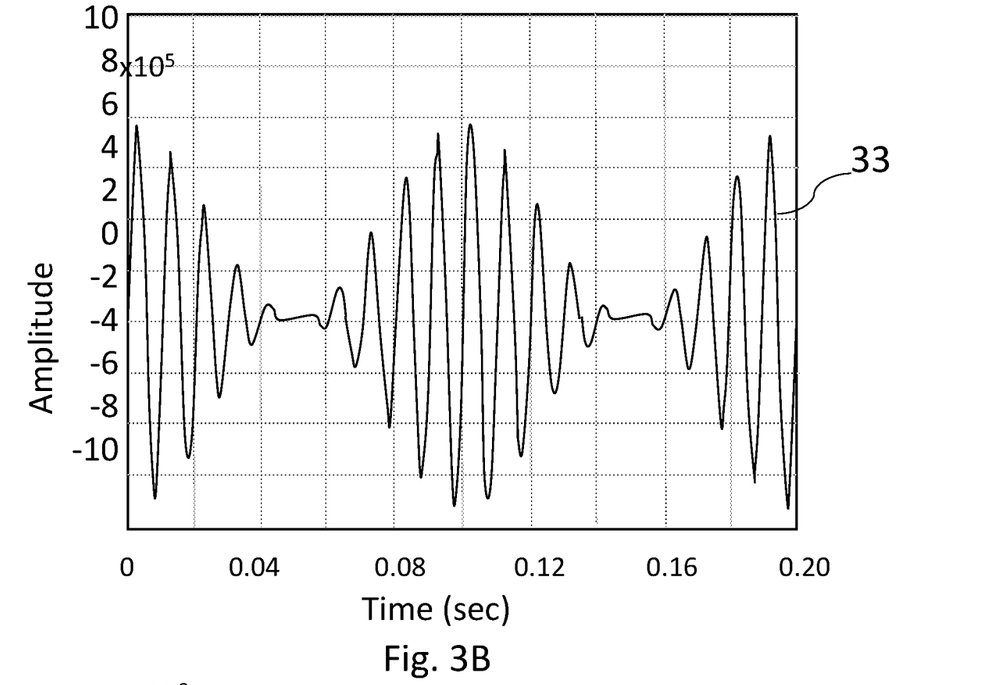
Figure 3C:
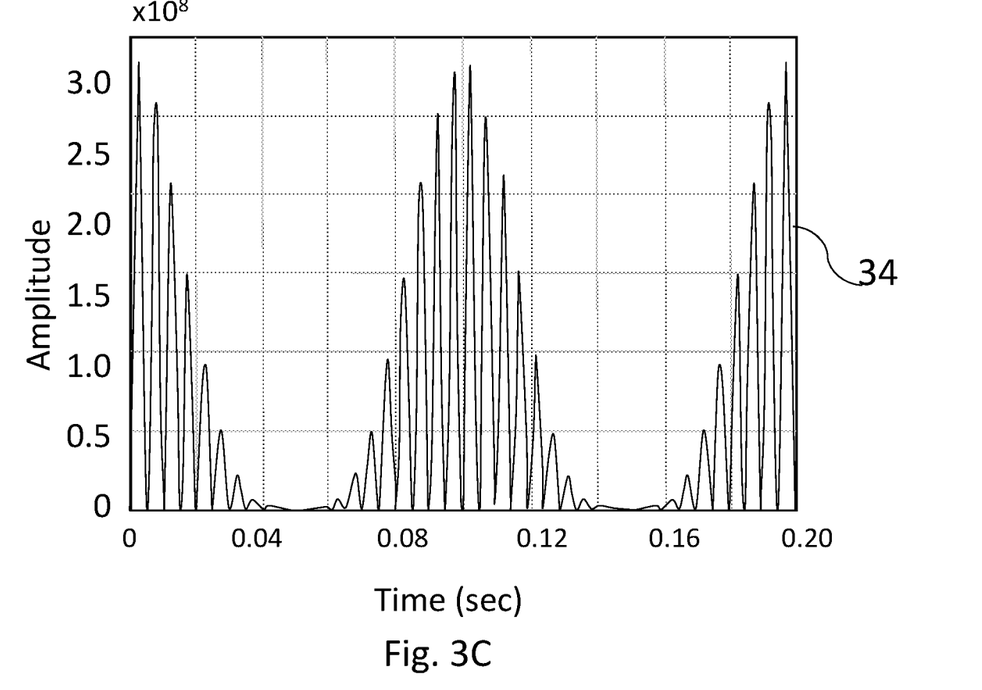

Reference is now made FIGS. 3B and 3C, which illustrate schematically more complex modulated input signals, required for providing a unique determination of the phase change, and for enabling the solution of the heat transfer equations for determining a combination of the unknowns in these equations. FIG. 3B shows an amplitude modulated pattern 33 having a cyclically variable modulation level for the current input, used for enabling solution to the heat transfer equations, and FIG. 3C shows the generated heat response 34 as a result of the input power impulse of the graph of FIG. 3B. The unique solution to the combination of unknowns in the heat transfer equations can be found if a modulation pattern having a swept modulation frequency is employed.

Figure 4:
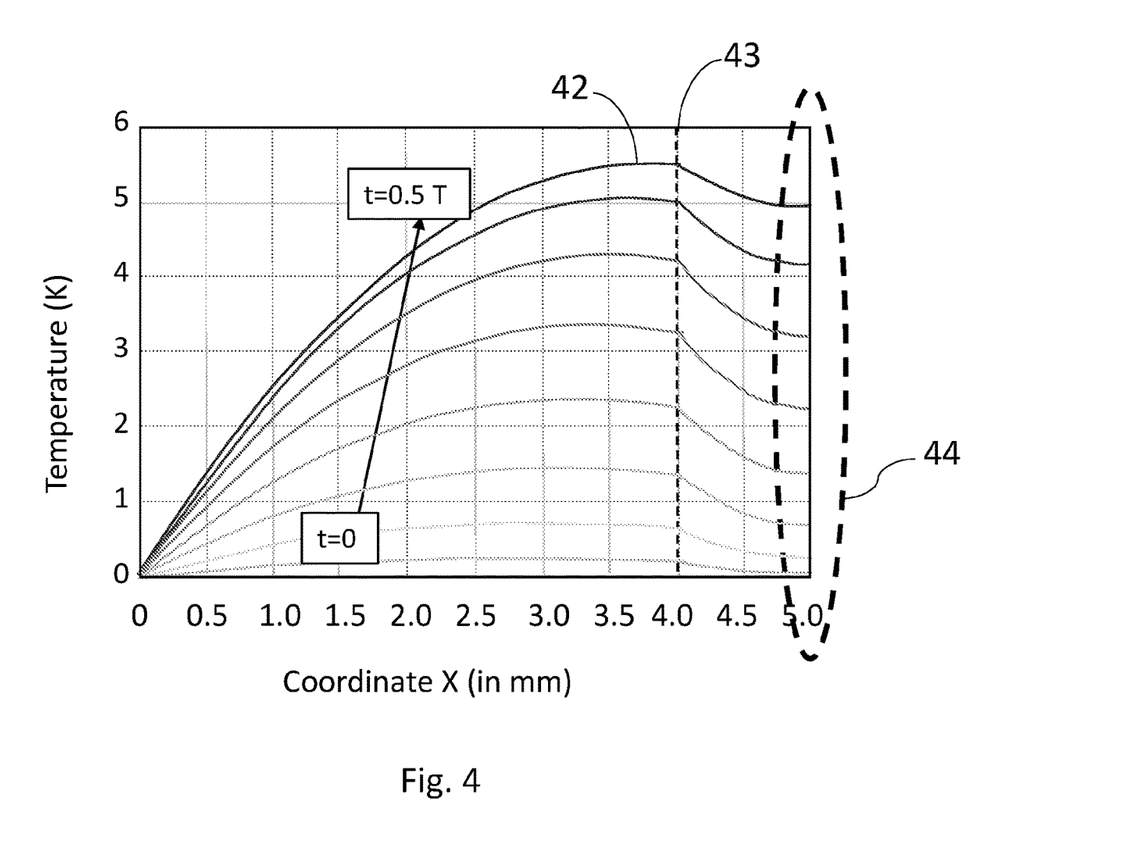
FIG. 4 is a graph illustrating schematically the temperature spatial distribution and temporal evolution in a 2-layer structure comprising a metallic substrate and a thermal barrier coating.

Reference is now made to FIG. 4, which illustrates schematically the temperature spatial distribution and temporal evolution in a 2-layer structure comprising the metallic substrate and the thermal barrier coating being measured. This is a simplified representation since a fuller model would include the effects of signal modulation, a three-layer structure including a bonding layer between the substrate and the TBC, and the effects of convection at the surface of the substrate distant from the TBC, and at the surface of the TBC. In FIG. 4, there is shown the modeled temperature expected from the heat flow out of the sample. The maximum level of heat 42 is generated in the substrate, just beyond the contact interface 43, and is conducted to the outside through two paths. The first is through the thermal barrier coating layer back to the outer surface of the TBC, where the surface temperature evolution is measured by the pyrometer before the heat is dissipated 44 by convection, and the second is into the parent material and towards the rear surface of the sample where it is dissipated by convection and conduction. As a result, the temperature rise is distributed accordingly along the substrate and the coating. The spatial distribution is plotted at different times from t=0 to t=0.5T, where T is the period of the modulated input power, to observe the temperature evolution in the composite sample. It is evident that the temperature rises with time at the contact interface and at the outer surface of the TBC, and the heat dissipates into the structure as time advances, and to the outer surface of the TBC.

Figure 5:
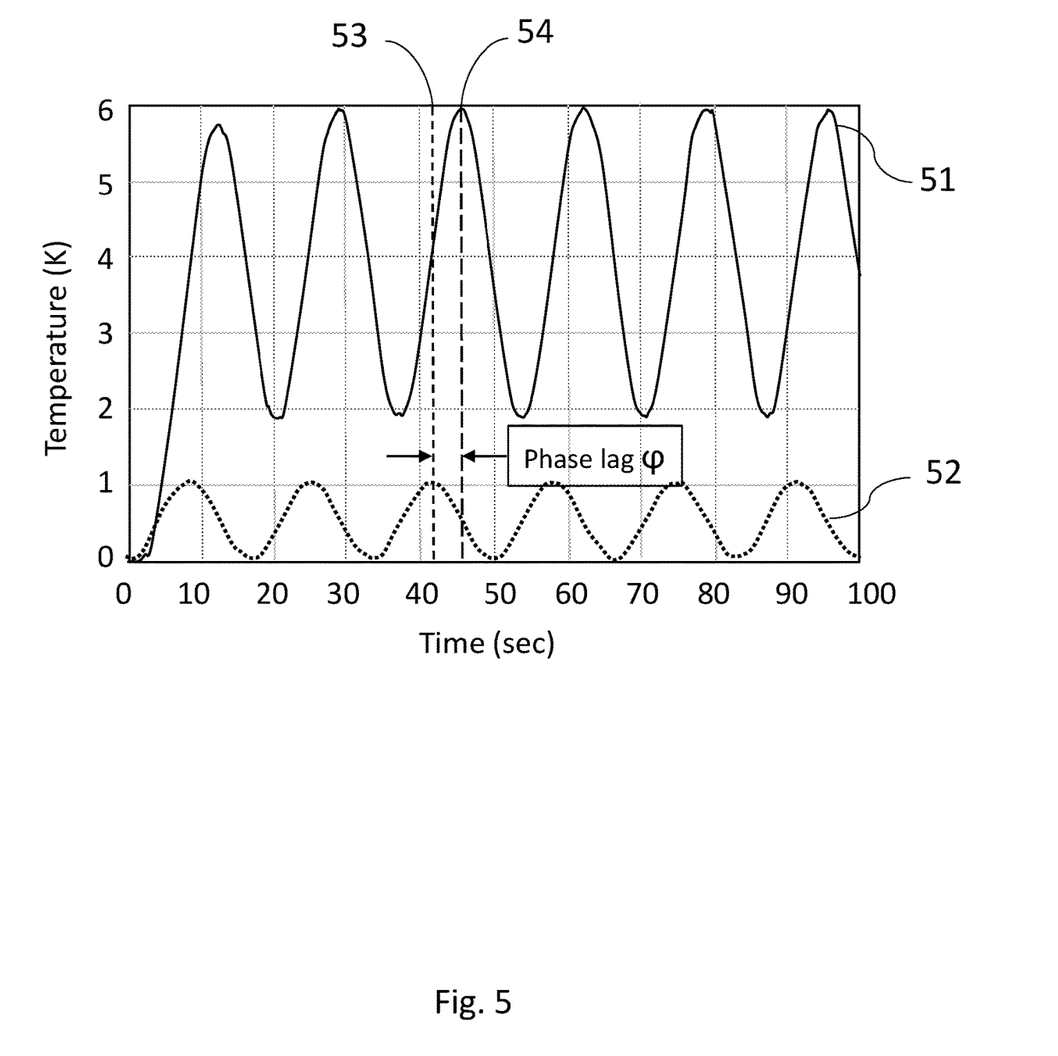
FIG. 5 shows schematically the temporal evolution of the thermal response output as a result of the temporally changing heat generation input.

Reference is now made to FIG. 5, which shows schematically the temporal evolution of the thermal response output 51 as a result of the temporally changing energy input 52. The ordinate is marked as the temperature representing the measured temperature of the thermal response output 51, which is the target result. For the energy input signal 52, the ordinate is understood to be the power level for a sinusoidal periodic input signal 52. The temperature rise at the coating surface develops into a periodical thermal response, which has a phase lag $\phi$ with respect to the internal generation heat signal. The temperature rise at the coating surface is measured as a function of time, and recorded to enable the calculation of the coating thermal properties following solution of the heat transfer equations involving the functionality of the phase shift $\phi$, as measured between the point 53 and 54.

Figure 6:
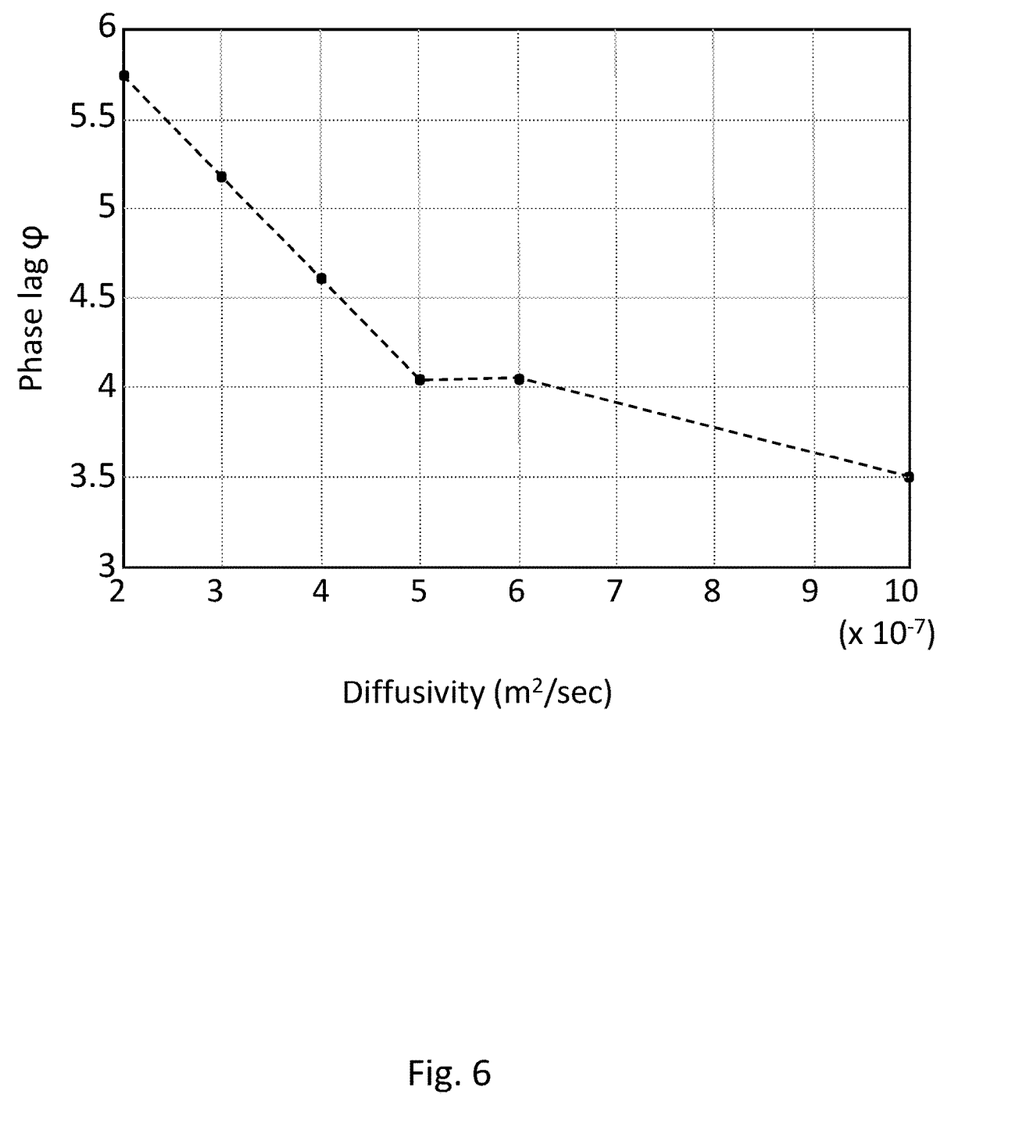
FIG. 6 is a graph showing a relationship between the thermal diffusivities and the expected phase lag for an exemplary thermal barrier coating.

The phase lag $\phi$ between the two signals depends on the thermal properties of the TBC. The diffusivity of different plasma-sprayed YSZ coatings ranges from 0.002 to 0.006 cm$^2$/sec, while the coating conductivity ranges from 0.01 to 0.04 W cm$^{-1}$K$^{-1}$. As shown in FIG. 6, calculated phase lags for these values reveals a relation between the properties and the measured phase shift between electric signals representing the input heat excitation and the detected output temperature measured. As expected, as the thermal diffusivity increases, the phase lag decreases.

The phase lag can be calculated for different TBC types in order to establish a unifying relation between the lag and thermal properties of the coating. This relation is the main component in the present methodology, as it allows determining thermal properties by measuring the lag between recorded temperature response on the exposed TBC surface and the modulated electrical input.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A system for determining the thermal properties of a non-metallic coating on a metallic base layer, the system comprising:
   an induction heating coil positioned to generate within the metallic base layer, a temporally varying heat waveform;
   a sensor for determining temporal changes in temperature, the sensor being disposed in proximity to or in contact with the outer surface of the coating, such that the sensor determines temporal changes in temperature of the outer surface of the coating, resulting from the generated temporally varying heat waveform; and
   a controller configured to receive a first signal from the temporally varying output of the sensor and a second signal corresponding to the temporal variation of the heat waveform, and to correlate the first and second signals to determine the phase angle between the temporally varying output of the sensor and the temporally varying heat waveform;
   wherein the controller is further configured to determine the thermal properties of the non-metallic coating on the basis of a determined relationship between at least one phase angle and a corresponding frequency of the temporally varying heat waveform.

2. A system according to claim 1, wherein the relationship further includes the thickness of the non-metallic coating.

3. A system according to claim 2, wherein the thickness is either known, or is determined by the controller from the relationship used.

4. A system according to claim 1, wherein the temporal variation of the heat waveform has an amplitude modulated form, the temporal variation being generated by a current generator providing output power for the induction heater.

5. A system according to claim 4, wherein the amplitude modulation is performed sequentially over a swept frequency range.

6. A system according to claim 1, wherein a functional relationship between the phase angle and a corresponding frequency of the temporally varying heat waveform is obtained from a solution of the heat transfer equations describing the thermal dynamics of the heat flow from the metallic base layer to the outer surface of the coating.

7. A system according to claim 1 wherein the thermal properties which the controller determines at least one of thermal diffusivity, heat transfer coefficient, thermal conductivity, and the thickness of the non-metallic coating.

8. A system according to claim 1, wherein the metallic base layer is an element of a turbine, and the non-metallic coating is a ceramic thermal barrier coating applied to the turbine element.

9. A system according to claim 1, wherein the sensor and the induction heating coil are disposed within a rod, the rod having a sufficiently small diameter that it can be used for in-situ examination of the blades of a gas turbine.

10. A system according to claim 1, wherein the sensor is either a radiation pyrometer or a contact temperature probe.

11. A method of determining the thermal properties of a non-metallic coating on a metallic base layer, the method comprising:
   using an induction coil, generating within the metallic base layer a temporally varying heat waveform;
   using a thermal sensor disposed in proximity to or in contact with the outer surface of the coating, to determine temporal changes in the temperature of the coating surface resulting from the generation of the temporally varying heat waveform;
   correlating a signal corresponding to the temporally varying output of the thermal sensor with a signal corresponding to the temporally varying heat waveform, and determining the phase angle between the signals; and
   determining the thermal properties of the non-metallic coating on the basis of a relationship determined between at least one phase angle and the corresponding frequency of a temporally varying heat waveform.

12. A method according to claim 11, wherein the relationship further includes the thickness of the non-metallic coating.

13. A method according to claim 12, wherein the thickness is either known, or is determined by the controller from the relationship used.

14. A method according to claim 11, wherein the temporal variation of the heat waveform has an amplitude modulated form, the temporal variation being generated by a current generator providing output power for the induction heater.

15. A method according to claim 14, wherein the amplitude modulation is performed sequentially over a swept frequency range.

16. A method according to claim 11, wherein a functional relationship between the phase angle and a corresponding frequency of the temporally varying heat waveform is obtained from a solution of heat transfer equations describing thermal dynamics of the heat flow from the metallic base layer to the outer surface of the coating.

17. A method according to claim 11, wherein the thermal properties which the controller is adapted to determine include at least one of the thermal diffusivity, the heat transfer coefficient, the thermal conductivity and the thickness of the non-metallic coating.

18. A method according to claim 11, wherein the metallic base layer is an element of a turbine, and the non-metallic coating is a ceramic thermal barrier coating applied to the turbine element.

19. A method according to claim 11, wherein the sensor and the induction heating coil are disposed within a rod, the rod having a sufficiently small diameter that it can be used for in-situ examination of the blades of a gas turbine.

20. A method according to claim 11, wherein the sensor is either a radiation pyrometer or a contact temperature probe.

* * * * *